(12) United States Patent
Ohta

(10) Patent No.: US 6,422,182 B1
(45) Date of Patent: Jul. 23, 2002

(54) ENGINE COOLING APPARATUS

(75) Inventor: Yutaka Ohta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/708,583

(22) Filed: Nov. 9, 2000

(30) Foreign Application Priority Data

Nov. 9, 1999 (JP) .......................................... 11-318591

(51) Int. Cl.$^7$ ................................................. F01P 3/00
(52) U.S. Cl. ................... 123/41.29; 180/68.4; 180/229; 165/44
(58) Field of Search ............................ 123/41.51, 41.29; 180/68.1, 68.4, 229; 165/41, 44, 51, 104.32, 917

(56) References Cited

U.S. PATENT DOCUMENTS 4,953,631 A * 9/1990 Kimura ..................... 123/41.51
5,176,111 A * 1/1993 Nakamura et al. ........ 123/41.51
5,992,554 A * 11/1999 Hasumi et al. ........... 123/41.51

FOREIGN PATENT DOCUMENTS

JP      5930781      9/1959
JP      3-82688      * 4/1991

* cited by examiner

Primary Examiner—Noah P. Kamen
(74) Attorney, Agent, or Firm—Birch, Stewart, Kolasch & Birch, LLP

(57) ABSTRACT

An engine cooling apparatus adopting a separate type radiator so as to make it possible to reduce the number of parts and simplify the internal structure of a water pump by connecting left and right radiators to a water pump. One end of a laterally-extending connecting pipe mounted across the engine in right and left directions is connected to a water pipe provided at an outlet tank of a left radiator, while the other end thereof is coupled with a joint pipe provided at an outlet tank of a right radiator. Water supplied from the left radiator flows through the laterally-extending connecting pipe and meets water flow from the right radiator in the outlet tank. A water pump sucks the water collected in the outlet tank through a water duct via a water pipe provided in the lower part of the outlet tank, and pressurizes the water and supplies it to a water jacket of the engine.

16 Claims, 7 Drawing Sheets

ENGINE COOLING APPARATUS

BACKGROUND OF THE INVENTION

1. Field of the Invention

The invention relates to an engine cooling apparatus with separate radiators.

2. Description of Background Art

An engine cooling apparatus with separate radiators for a motorcycle has been known (e.g., Japanese Utility Model Publication Sho59-30781), in which right and left radiators arranged in a spaced apart fashion on right and left sides of a motorcycle are connected to a water pump in such a manner that water hoses extending from each of the right and left radiators are gathered together immediately before the water pump, or each water hose is connected to the water pump directly.

In this conventional pipe layout, a Y-shaped joint pipe is required to assemble the right and left water hoses, so that the number of parts is increased. When each water hose is connected to the water pump directly, two inlets have to be formed on the water pump for connecting two radiators, making the water channel configuration of the water pump more complicated. This is especially true in a multi-channel type configuration where another inlet for a bypass channel for idling is formed on the water pump. Therefore, an object of the present invention is to provide an engine cooling apparatus capable of preventing an increase in the number of parts while simplifying the water pump configuration.

SUMMARY OF THE INVENTION

To solve the above problem, there is provided an engine cooling apparatus according to the present invention which includes a separate type radiator mounted separately on right and left sides of a motorcycle, wherein the separate type radiator includes a first radiator mounted on one side of the motorcycle and connected to a water pump of the engine through a water duct. A second radiator is mounted on the other side of the motorcycle and an outlet tank of the second radiator communicates with an outlet tank of the first radiator through a laterally-extending connecting pipe.

According to the invention, the first radiator is connected to the water pump of the engine through the water duct, while the outlet tank of the second radiator communicates with the outlet tank of the first radiator through the laterally-extending connecting pipe. Therefore, it is no longer necessary to use the Y-shaped joint pipe for coupling with the water tank, as in the conventional radiator, so that the number of parts can be reduced. It is also possible to simplify the water channel configuration because the water pump has a single inlet, unlike the conventional radiator having right and left water hoses individually connected to the water pump directly. Since the water pump has a single inlet from the radiator, the complex channel configuration can be avoided even when the multi-channel type configuration is used where the water pump has an inlet for the bypass channel for idling.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
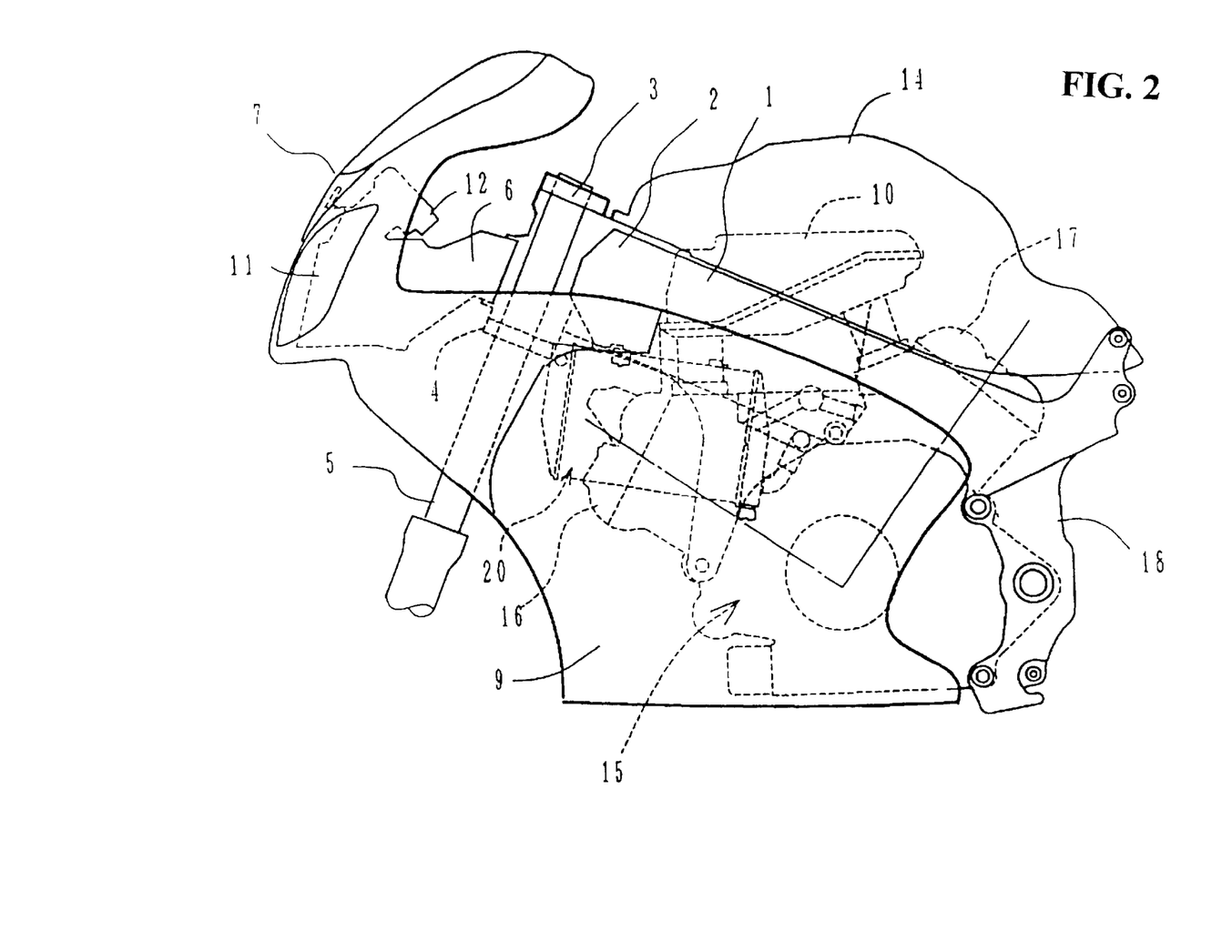
FIG. 2 is a side view showing major components of the forward portion of a motorcycle embodying the embodiment of FIG. 1.
Figure 3:
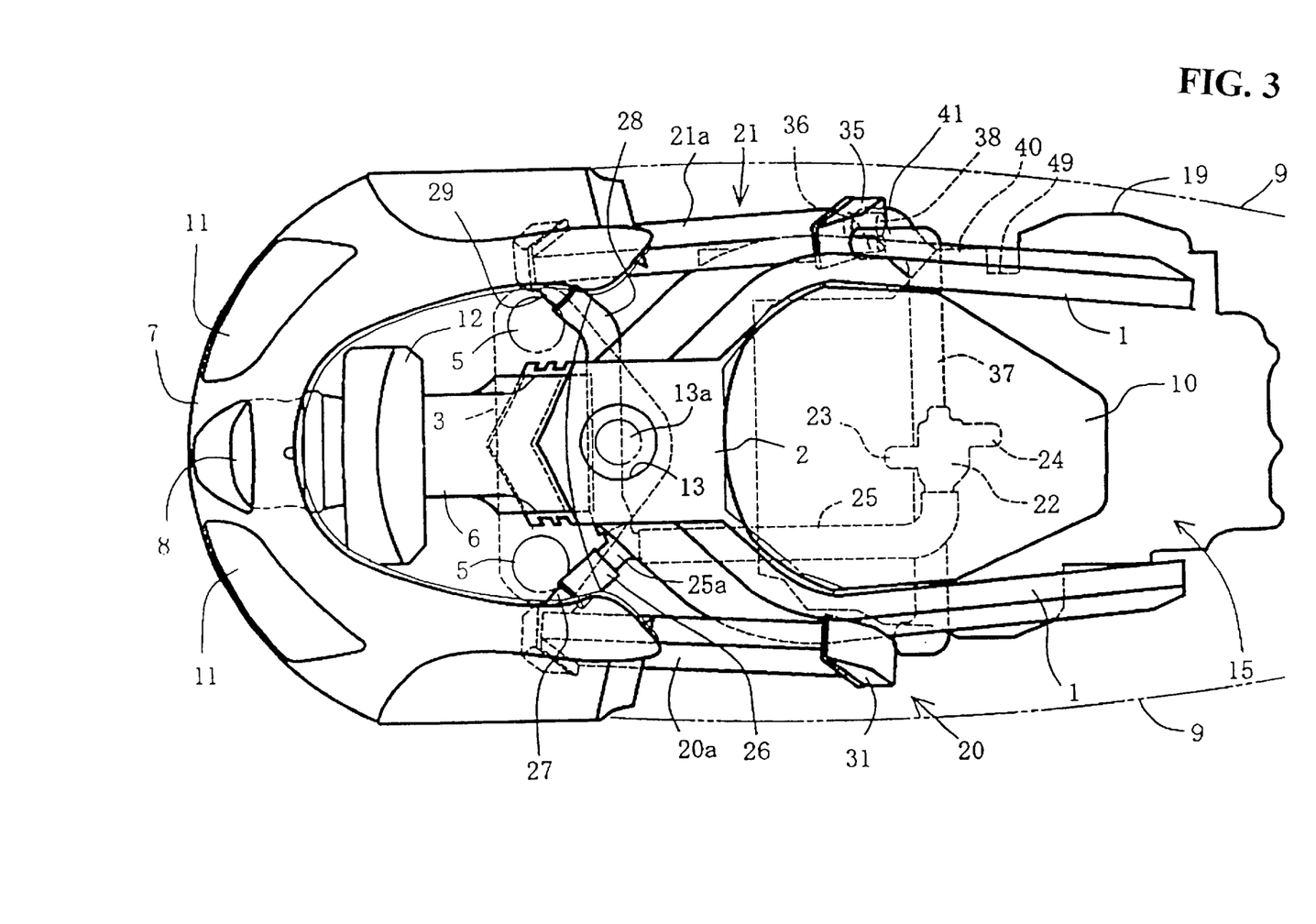
FIG. 3 is a plan view of FIG. 2.

One embodiment of the present invention applied to a motorcycle will be described below with reference to the accompanying drawings. FIGS. 2 and 3 are a side view and a plan view, respectively, of major components of the forward portion of a motorcycle incorporating the present invention. As is obvious from these drawings, the motorcycle includes a pair of right and left main frames 1,1 extending in forward and backward directions of the motorcycle body, with front ends thereof being coupled to the rear end of a head box 2.

The head box 2 controllably supports upper ends of a pair of right and left front forks 5,5 mounted in upward and downward directions via a top bridge 3 and a bottom bridge 4 which are pivotably coupled on and under the head box 2, respectively. The front forks 5, 5 rotatably support a front wheel, which is not shown, between the lower portions thereof.

The head box 2 is a hollow member mounted in forward and backwards directions of the motorcycle body along the centerline thereof The head box is constructed from a rigid material such as by casting an aluminum alloy, for example. The front end of the head box 2 is coupled to the rear end of an inlet duct 6.

The inlet duct 6 is also a hollow resin member having certain rigidity. The inlet duct 6 projects forward from the head box 6 along the centerline of the motorcycle body. The front end of the inlet duct 6 is connected to an air inlet 8 formed in the center of the front end of a front cowling 7.

Air is taken from the air inlet 8 into the inlet duct 6 to flow through the head box 2, and is sucked by an air cleaner 10 arranged in a space between the right and left main frames 1,1 behind the head box 2. Namely, by incorporating the head box 2 in the air intake channel, air can be taken linearly along the centerline of the motorcycle body, penetrating forwardly and backwardly through the forward portion of the frame of the motorcycle.

The air inlet 8 is positioned between right and left headlights 11, 11 which are larger than the vertical width of the air inlet 8. The air inlet 8 is opened in the front cowling 7 at a position subjected to the highest wind pressure. The inlet duct 6 supports both the front cowling 7 and a dashboard 12 simultaneously.

The head box 2 includes a tubular column member for connecting parts above and below it, with the top and bottom ends thereof opened in the top and bottom surfaces of the head box 2, respectively, as openings 13 (although only the top surface side is shown in FIG. 2). A steering handle 13 vertically penetrates through the hollow section of the column member to connect the top and bottom bridges 3, 4.

As shown in FIG. 2, the air cleaner 10 is covered on top by a fuel tank 14 and supplies air in a downwardly drifting manner to each of a front cylinder 16 and a rear cylinder 17 of a 4-cycle water-cooled V type engine 15 mounted under the air cleaner 10. The engine 15 is supported by the main frames 1,1 and a pair of downwardly projecting right and left pivot frames 18 are coupled to the rear ends of the main frames. The pivot frames 18 swingably support a rear swing arm which is not shown.

In FIG. 2, a side cover 9 is provided for covering the side of the motorcycle body from the front to the engine 15, with the front end thereof coupled to the front cowling 7. As a whole, this is a body cover for covering the front half of the motorcycle body. The side cover 9 also covers the side of right and left separate type radiators, which will be described later.

With reference to FIGS. 1 and 4–6, the configuration of the separate type radiator for cooling the engine 15 will be described.

Figure 1:
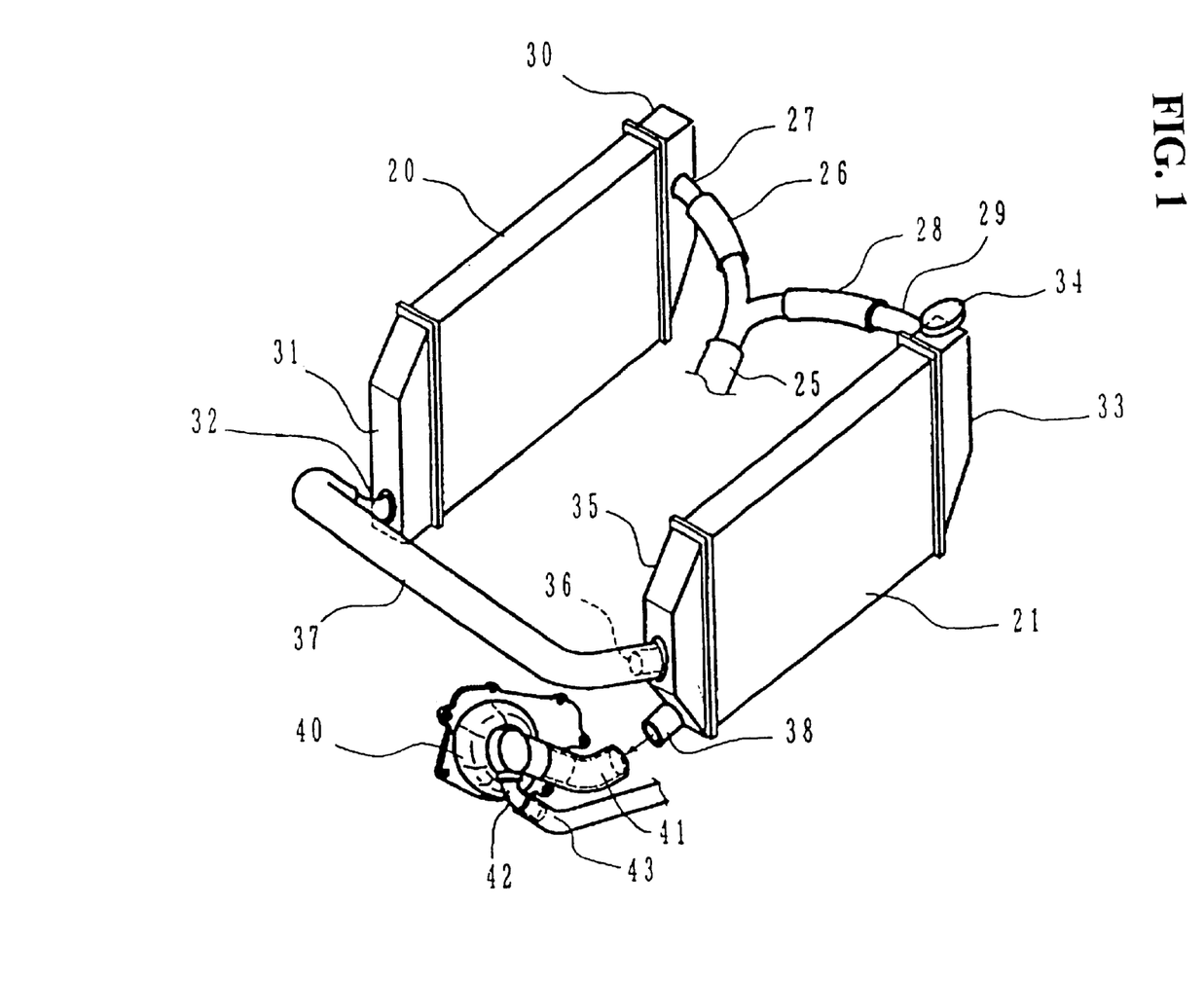
FIG. 1 is a schematic view of a separate type radiator according to one embodiment of the invention.

First, the general configuration of the separate type radiator will be described with reference to FIG. 1. The separate type radiator includes a pair of left and right radiators 20, 21 mounted separately on left and right sides of the motorcycle body. Each radiator is suspended from the main frames 1,1 and radiator bodies 20a, 21a are generally parallel to each other and face each other relative to the front cylinder 16.

Water is heated by cooling the engine 15 and is guided forward from a thermostat 22 through an assembling hose 25 formed by a rubber hose or the like mounted in forwardly and backwardly directions of the motorcycle body. The water diverges at a Y-shaped joint 25a coupled to the front end of the assembling hose 25 so that some of the water flows into the left radiator 20 through a left water covering hose 26 formed by a rubber hose or the like and a left water covering pipe 27. The rest of the water flows into the right radiator 21 through a right water covering hose 28 formed by a rubber hose or the like and a right water covering pipe 29.

The left radiator 20 includes an inlet tank 30 coupled with the left water covering pipe 27, the radiator body 20a which exchanges heat, and an outlet tank 31. The inlet tank 30 is mounted near the front of the motorcycle body, the radiator body 20a faces the left side of the front cylinder 16, and the outlet tank 31 is mounted in the back of the motorcycle body. A water pipe 32 projects upwardly in an inclined manner from the lower part of the back of the outlet tank 31. The inlet tank 30 and the outlet tank 31 are symmetrical in shape in that the inlet tank 30 becomes narrower to the bottom while the outlet tank 31 becomes narrower to the top.

Water guided into the inlet tank 30 is sufficiently cooled while it passes through the radiator body 20a to the back of the motorcycle body by exchanging heat with air contacting the surface of the radiator body 20a, and is then gathered in the outlet tank 31. At this time, air is introduced from an air guiding opening (not shown) formed in the front cowling 7 under the headlight 11 and opened in forward and backwards directions of the motorcycle body. The air flows backwardly in a space between the left radiator 20 and the left side of the front cylinder 16 to enhance heat exchange by contacting the surface of the radiator body 20a. The same cooling effect is also given by such airflow at the right radiator 21.

The right radiator 21 includes an inlet tank 33 coupled with the right water covering pipe 29, the radiator body 21a which exchanges heat, and an outlet tank 35. The inlet tank 33 is mounted near the front of the motorcycle body, the radiator body 21a faces the right side of the front cylinder 16, and the outlet tank 35 is mounted in the back of the motorcycle body.

The inlet tank 33 has an injection opening on the top surface, which is opened and closed by a cap 34. The inlet tank 33 becomes narrower to the bottom, while the outlet tank 35 is beveled at both top and bottom portions thereof so that the middle portion of the outlet tank projects the most to the back. From this portion, a joint pipe 36 extends backwardly. The joint pipe 36 and the water pipe 32 of the left radiator 20 are connected via a laterally-extending connecting pipe 37 formed by a rubber hose or the like mounted across the motorcycle body.

A water pipe 38 projects downwardly in an inclined manner from the back of the lower part of the outlet tank 35 to connect directly to the water pump 40 via a water duct 41 formed by a rubber hose or the like. Thus, the right radiator 21 serves as the first radiator of the invention, while the left radiator that is not connected directly to the pump 40 serves as the second radiator.

Figure 6:
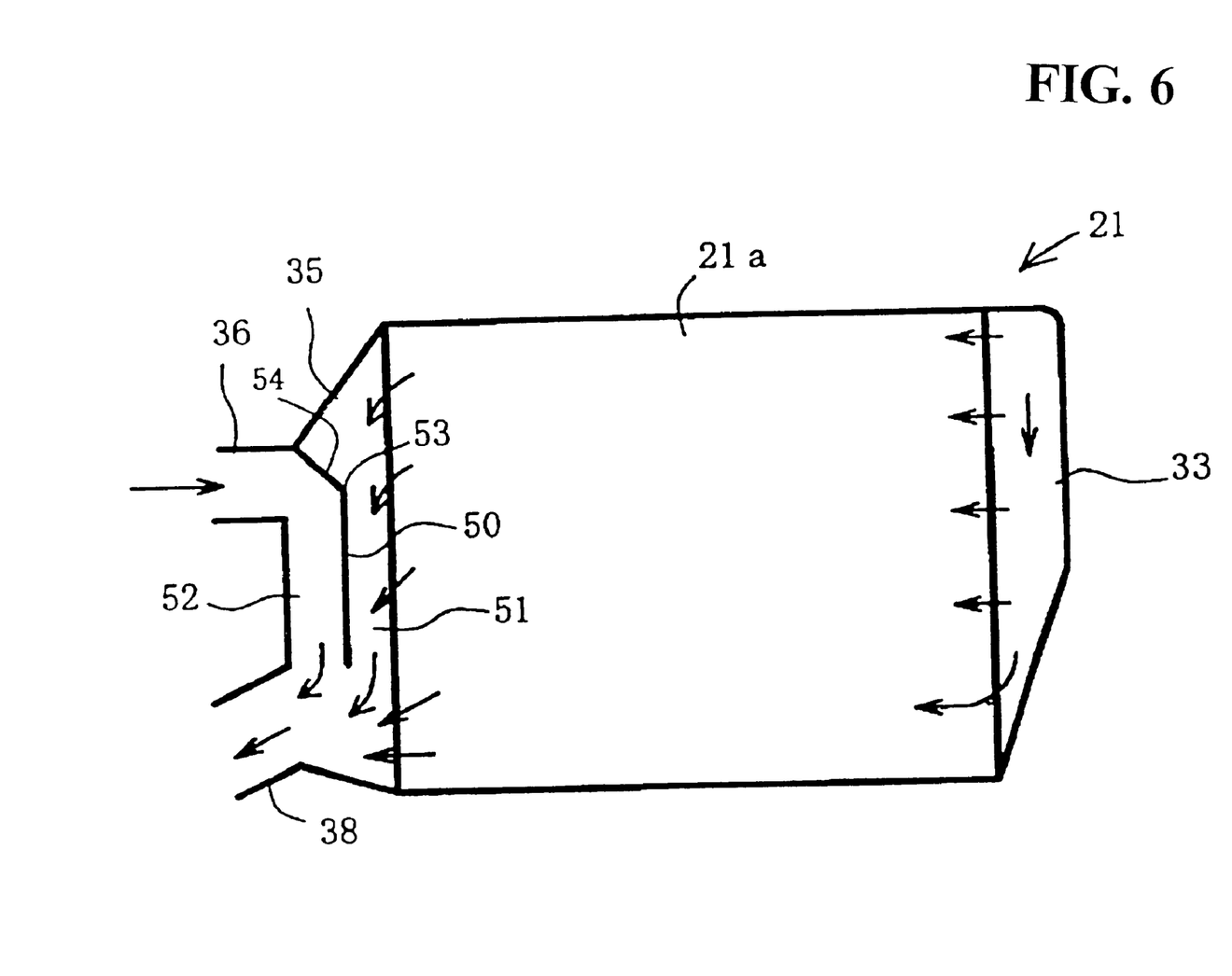
FIG. 6 is a schematic view showing the internal structure of the first radiator.

The left and right radiators 20, 21 are mounted so that the bottom surfaces of the outlet tanks 31, 35 are lower than those of the inlet tanks 30, 33 (See FIG. 2). The bottom of the outlet tank 35 of the right radiator 21 is inclined so that water can flow into the water pipe 38 smoothly (FIG. 6).

The water pump 40 sucks, via the water pipe 38 and the water duct 41, water cooled by the left radiator 20 and guided through the laterally-extending connecting pipe 37 and water from the outlet tank 35 cooled by the right radiator 21. The water pump 40 then applies pressure to the water and supplies it to a water jacket of each cylinder. The water pump 40 also has a bypass pipe 42 for guiding water directly, without passing through the radiators, from a bypass hose 43 formed by a rubber hose or the like which connects between a bypass circuit in the thermostat 22 and the bypass pipe 42 during idling when the thermostat 22 remains closed, and returns the water to the engine side.

Figure 4:
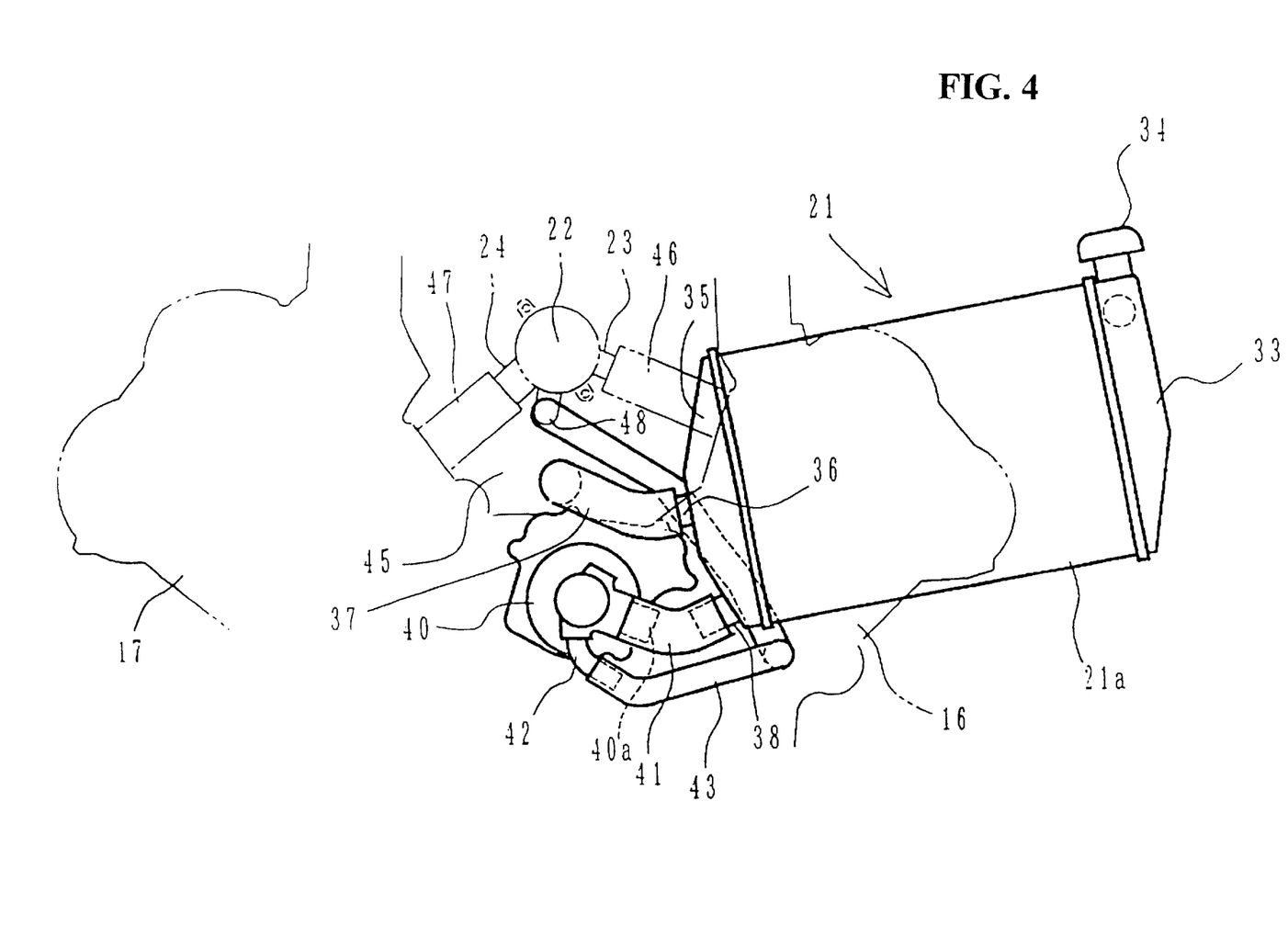
FIG. 4 shows the first radiator when seen from the right side of the motorcycle.
Figure 5:
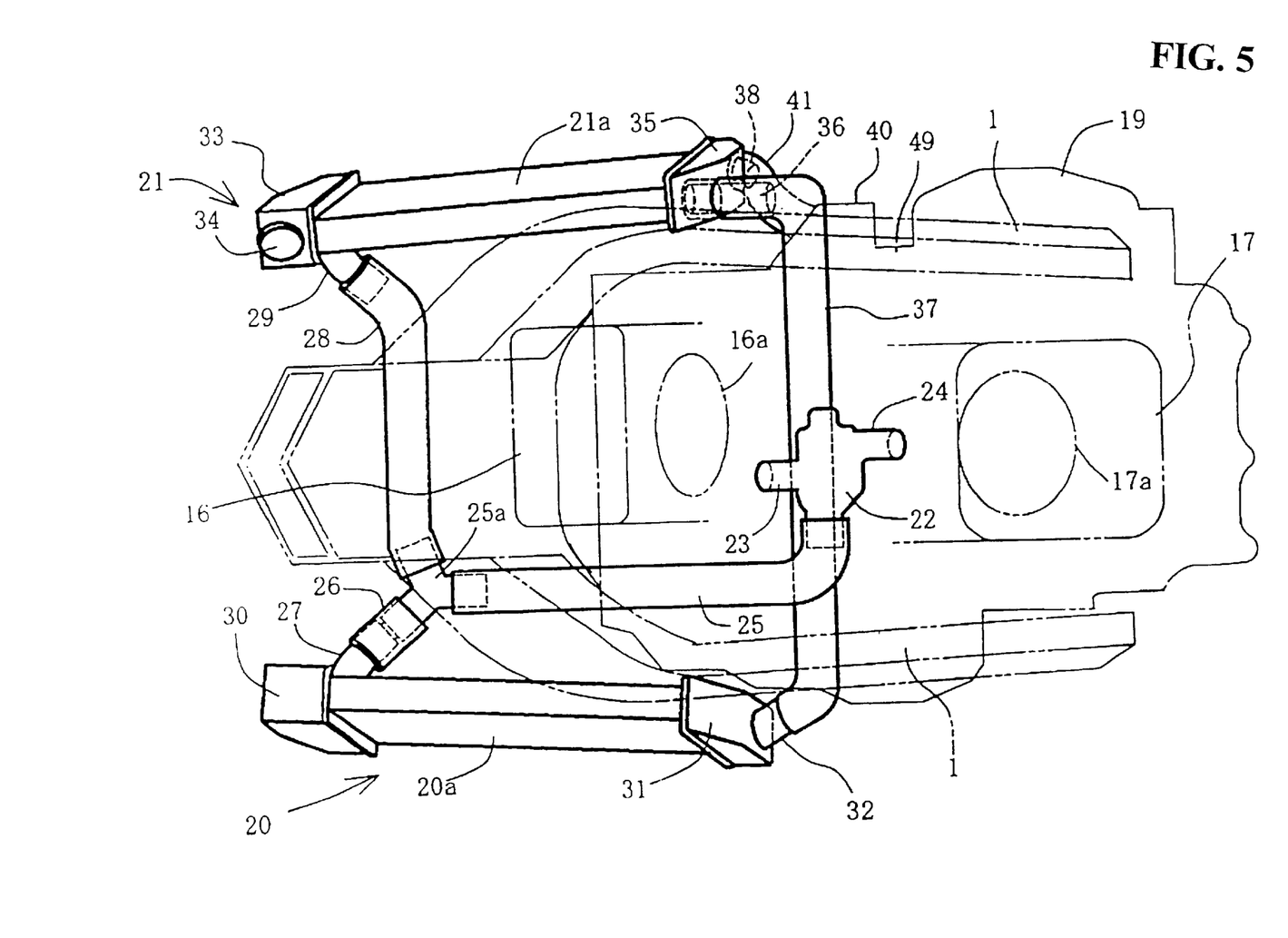
FIG. 5 is a plan view showing the pipe layout of the separate type radiator.

As shown in FIGS. 4 and 5, the thermostat 22 is located in the upper part of a valley shaped space 45 formed between the front cylinder 16 and the rear cylinder 17, and has front and rear joint pipes 23, 24 projecting in forward and backwards directions, respectively, of the motorcycle body. As can be seen from FIG. 4, the front joint pipe 23 is connected to the outlet of the water jacket of the front cylinder 16 via a front water covering hose 46, while the rear joint pipe 24 is connected to the outlet of the water jacket of the rear cylinder 17 via a rear water covering hose 47.

A bypass pipe 48 connected with the bypass circuit inside the thermostat 22 projects downwardly, to which one end of the bypass hose 43 is connected. The bypass hose 43 first extends from the bypass pipe 42 of the water pump 40 under the water duct 41 and the outlet tank 35, and then turns upwardly to reach the bypass pipe 48 in the valley shaped space 45 under the thermostat 22.

The laterally-extending connecting pipe 37 runs across the lower part of the valley shaped space 45 under the thermostat 22. The bypass hose 43 and the bypass pipe 42 are connected at a position above and behind the laterally-extending connecting pipe 37 so as not to interfere with the pipe 37, thus facilitating the installation of the laterally-extending connecting pipe 37.

As is obvious from FIG. 5, the water pump 40 is mounted on a right case 49 of the engine 15 at a position close to the bottom of the valley between the front and rear cylinders 16, 17, such that an inlet pipe 40a comes close to the water pipe 38 of the outlet tank 35 of the right radiator 21. In FIG. 5, a clutch 19, a cylinder bore 16a of the front cylinder 16, and a cylinder bore 17a of the rear cylinder 17 are illustrated.

As shown in FIG. 6, a separator 50 is formed inside the outlet tank 35 of the right radiator 21 so as to divide the interior of the outlet tank 35 into front and rear channels 51, 52. The upper part of the separator 50 overlaps the extension of the joint pipe 36, and upstream of a bend 53 forms an inclined surface 54 inclining backwardly with the top end thereof attached to an upper part of the outer wall of the outlet tank 35. As a result, the joint pipe 36 only communicates with the rear channel 52.

The body of the separator 50 formed downstream of the bend 53 projects downwardly generally in parallel with the connecting surface between the outlet tank 35 and the right radiator 21. The bottom end of the separator 50 stops near the position where the water pipe 38 is attached, so that the front and rear channels 51, 52 merge at the extension of the water pipe 38. The narrowest portions of the laterally-extending connecting pipe 37 and the water duct 41 are the joint pipe 36 and the water pipe 38, respectively, with the water pipe 38 having a larger inner diameter than the joint pipe 36.

Next, the operation of the present invention will be described. As is obvious from FIG. 1, heated water is introduced into the left radiator 20 from the assembling hose 25 via the left water covering hose 26 and the left water covering pipe 27, cooled by the radiator body 20a and guided into the outlet tank 31. Water in the outlet tank 31 is then guided to the outlet tank 35 of the right radiator 21 through the laterally-extending connecting pipe 37 and the joint pipe 36. In the right radiator 21, heated water introduced into the inlet tank 33 via the right water covering hose 28 and the right water covering pipe 29 is cooled by the radiator body 21a and guided into the outlet tank 35.

Water from the left and right radiators 20, 21 merged in the outlet tank 35 is pressurized and guided to respective water jackets of the front and rear cylinders 16, 17 through the water pipe 38 and the water duct 41 in order to cool the cylinders.

Since the outlet tank 31 of the left radiator 20 is made to communicate with the outlet tank 35 of the right radiator 21 via the laterally-extending connecting pipe 37, it is no longer necessary to connect the outlet tank 31 of the left radiator 20 immediately before or directly to the water pump 40. Therefore, the use of the Y-shaped joint pipe for connecting the outlet tank with the water pump 40 immediately before the water pump 40, as in the conventional radiator, can be eliminated and the number of parts can be reduced.

There is no direct connection between the outlet tank and the water pump 40 and the water pump 40 has a single inlet pipe 40a, so that the water channel configuration within the water pump 40 can be simplified. The fact that the water pump 40 has a single inlet from the radiator side prevents the complication of the water channels even when the multi-channel type configuration including the water pump 40 having an inlet of the bypass channel, i.e., the bypass pipe 42 is used. Therefore, an increase in the number of parts is avoided, while preventing complications with regard to the water pump configuration.

As can be seen from FIG. 5, the laterally-extending connecting pipe 37 is laid under the thermostat 22 in the valley-shaped space 45 formed by the front and rear cylinders 16, 17. By the effective use of this valley-shaped space 45, the pipe 37 can be mounted easily, although it runs across the engine 15 in the width direction thereof. Installation of the pipe 37 is easy even when the bypass channels are increased, as the pipe 37 is installed without interfering with the bypass hose 43.

As can be seen from FIG. 6, the separator 50 is provided in the outlet tank 35. Without the separator 50, as indicated by arrows in FIG. 6, the water flow from the right radiator 21 flowing from the front to the back would oppose the water flow from the left radiator 20 flowing from the back to the front through the joint pipe 36. Two flows would then meet inside the outlet tank 35 and disturb the water flow, thereby producing flow resistance.

As illustrated in FIG. 6, the separator 50 is provided to divide the interior of the outlet tank 35 into the front and rear channels 51, 52 with the rear channel 52 communicating with the joint pipe 36. As a result, the water flowing from the left radiator 20 through the joint pipe 36 is guided to flow through the rear channel 52 separately from the water from the right radiator 21, and gradually flows in the same direction as the water from the right radiator 21 flowing through the front channel 51. The two flows meet at a lower part of the tank, become one flow flowing in one direction, which is guided to the water pipe 38.

Although the two water channels in which water flows in opposite directions are merged in the outlet tank 35, it is possible to smooth the water flow at the merging point to reduce the flow resistance and improve the cooling effect. In addition, a portion of the separator 50 in the outlet tank 35 located on the extension of the joint pipe 36 forms the inclined surface 54, so that it is also possible to further smooth the downward water flow from the left radiator 20 via the joint pipe 36.

The water pipe 38 is the narrowest part of the water duct 41 and the joint pipe 36 is the narrowest part of the laterally-extending connecting pipe 37, with the water pipe 38 having a large inner diameter than the pipe 37 in order to handle a large volume of water in the water pipe 38 where waters gather from both left and right radiators 20, 21. This also contributes to the smooth water flow.

Figure 7:
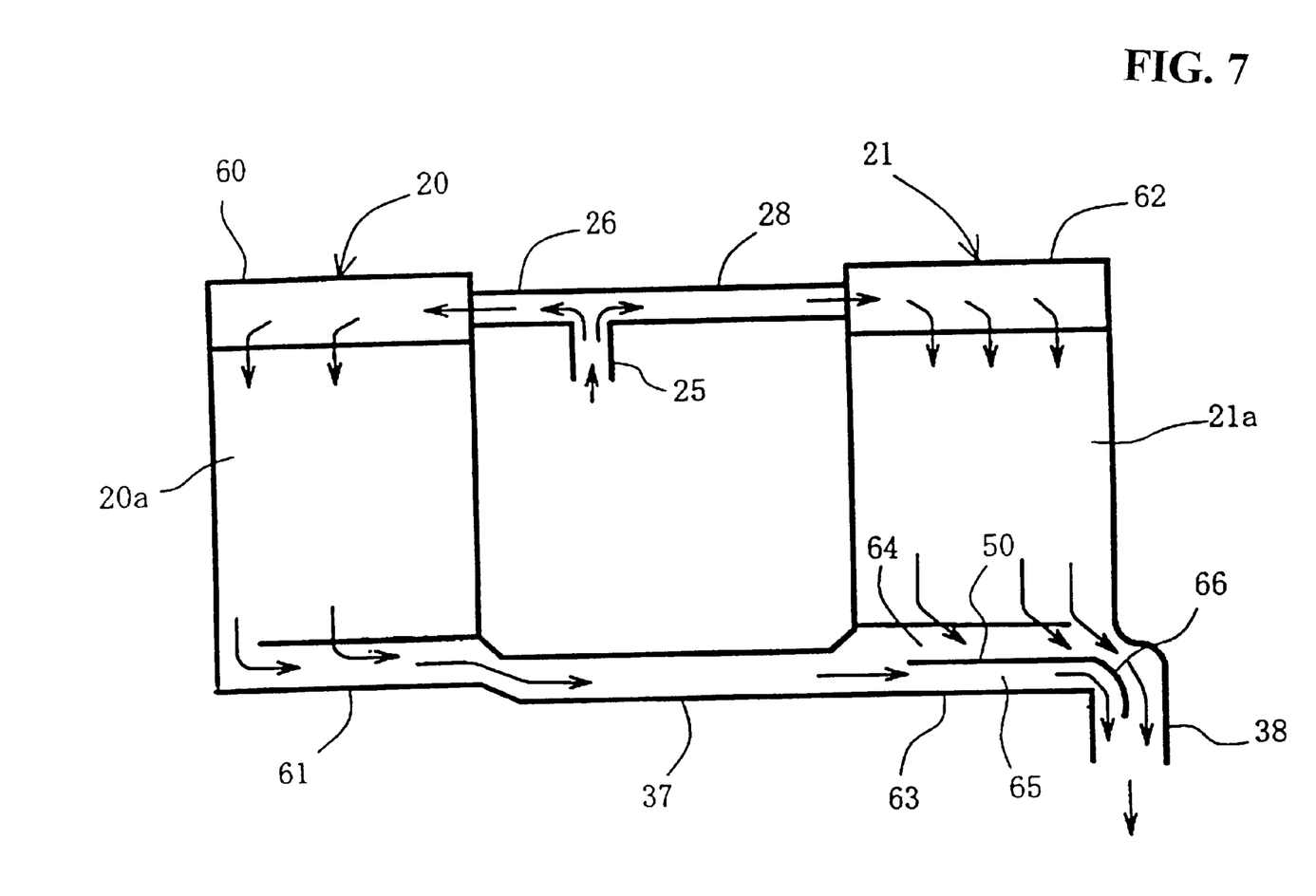
FIG. 7 is a schematic view showing the internal structure of a separate type radiator according to another embodiment of the invention.

FIG. 7 is a schematic diagram of another embodiment of the separate radiators showing the internal structure thereof as in FIG. 6, except that the entire separate radiators is seen from behind the motorcycle body. The same reference numbers are given to the parts common to the previous embodiment. In this embodiment, left and right radiators 20, 21 do not face each other and radiator bodies 20a, 21a face forward. Upper tanks 60, 62 (equivalent to the inlet tanks) and lower tanks 61, 63 (equivalent to the outlet tanks) are provided on top and at the bottom of each radiator.

The lower tanks 61 and 63 are connected to each other by the laterally-extending connecting pipe 37, and the separator 50 is provided in the lower tank 63 of the right radiator 21 in order to divide the interior of the lower tank 63 into lower and upper channels 64, 65. One end of the separator 50 turns at a curve 66 formed near the water pipe 38 and projects into the water pipe 38. It should be noted that the water returning structure in which heated water is returned to the left and right radiators 20, 21 from the thermostat through the left and right water covering hoses 26, 28, respectively, via the assembling hose 25 is the same as that of the previous embodiment.

With this arrangement, it is also possible to obtain the same effect as in the previous embodiment by connecting the lower tank 61 of the left radiator 20 to the lower tank 63 of the right radiator 21 by the laterally-extending connecting pipe 37 and combining water from the left and right radiators 20, 21 to introduce it into the water pipe 38. The separator 50 also functions similarly to smooth the water flow, especially by providing the curve 66.

Although the present invention has been described with reference to the illustrated embodiments, it should be understood that various modifications and other applications are possible to the invention. For example, the right radiator can serve as the second radiator and is connected to the left radiator serving as the first radiator by providing the water pump on the left side of the engine. Also, the present invention can be applied to various types of vehicles other than motorcycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine cooling apparatus comprising:
   separate radiators for mounting separately on right and left sides of a motorcycle;
   said separate radiators comprising:
      a first radiator for mounting on one side of the motorcycle adapted to be connected to a pump of the engine through a conduit;
      a second radiator for mounting on the other side of the motorcycle;
      an outlet tank of the second radiator communicating with an outlet tank of the first radiator through a laterally-extending connecting pipe; and
      a separator provided in the outlet tank of the first radiator for temporarily separating fluid flowing from the first radiator from fluid guided through the laterally-extending connecting pipe.

2. The engine cooling apparatus according to claim 1, wherein the conduit has a larger channel than the laterally-extending connecting pipe.

3. The engine cooling apparatus according to claim 1, wherein said second radiator includes an inlet tank that is narrower at a bottom end relative to a top end thereof.

4. The engine cooling apparatus according to claim 1, wherein said outlet tank of said second radiator is narrower at a top end relative to a bottom end thereof.

5. The engine cooling apparatus according to claim 1, wherein said first radiator includes an inlet tank that is narrower at a bottom end relative to a top end thereof.

6. The engine cooling apparatus according to claim 1, wherein said outlet tank of said first radiator is beveled at both a top end and a bottom end with an intermediate portion extending therebetween, said laterally-extending connecting pipe being connected between a bottom end of outlet tank of said second radiator and said intermediate portion of said first radiator.

7. The engine cooling apparatus according to claim 1, wherein said separator is a plate member extending within said outlet tank of said first radiator for directing a flow of fluid from said second radiator to a bottom end of said first radiator.

8. The engine cooling apparatus according to claim 7, wherein said separator includes an inclined portion for initially receiving fluid from said second radiator and for directing the fluid downwardly within the outlet tank of the first radiator.

9. An engine cooling apparatus comprising:
   a first radiator for mounting on one side of a vehicle;
   a second radiator for mounting on the other side of the vehicle;
   a pump for connecting the first radiator to an engine through a conduit;
   an outlet tank operatively connected to said second radiator;
   an outlet tank operatively connected to said first radiator;
   a laterally-extending connecting pipe for connecting the outlet tank of said second radiator to the outlet tank of said first radiator; and
   a separator provided in the outlet tank of the first radiator for temporarily separating fluid flowing from the first radiator from fluid guided through the laterally-extending connecting pipe.

10. The engine cooling apparatus according to claim 9, wherein the conduit has a larger channel than the laterally-extending connecting pipe.

11. The engine cooling apparatus according to claim 9, wherein said second radiator includes an inlet tank that is narrower at a bottom end relative to a top end thereof.

12. The engine cooling apparatus according to claim 9, wherein said outlet tank of said second radiator is narrower at a top end relative to a bottom end thereof.

13. The engine cooling apparatus according to claim 9, wherein said first radiator includes an inlet tank that is narrower at a bottom end relative to a top end thereof.

14. The engine cooling apparatus according to claim 9, wherein said outlet tank of said first radiator is beveled at both a top end and a bottom end with an intermediate portion extending therebetween, said laterally-extending connecting pipe being connected between a bottom end of outlet tank of said second radiator and said intermediate portion of said first radiator.

15. The engine cooling apparatus according to claim 9, wherein said separator is a plate member extending within said outlet tank of said first radiator for directing a flow of fluid from said second radiator to a bottom end of said first radiator.

16. The engine cooling apparatus according to claim 15, wherein said separator includes an inclined portion for initially receiving fluid from said second radiator and for directing the fluid downwardly within the outlet tank of the first radiator.

* * * * *